US005728782A

United States Patent [19]
Brady et al.

[11] Patent Number: 5,728,782
[45] Date of Patent: Mar. 17, 1998

[54] GAS PHASE ANIONIC POLYMERIZATION OF DIENES AND VINYL-SUBSTITUTED AROMATIC COMPOUNDS

[75] Inventors: Monika Brady, Bound Brook; Kevin Joseph Cann, Rocky Hill; David Joseph Dovedytis, South River, all of N.J.

[73] Assignee: Union Carbide Chemicals & Plastics Technology Corporation, Danbury, Conn.

[21] Appl. No.: 761,797

[22] Filed: Dec. 6, 1996

[51] Int. Cl.$^6$ .................... C08F 4/48; C08F 2/34
[52] U.S. Cl. ............... 526/63; 526/173; 526/178; 526/179; 526/335; 526/337; 526/340; 526/913; 524/789; 524/791; 524/855; 524/856; 523/207
[58] Field of Search ............... 526/63, 173, 176, 526/183, 190, 913, 178, 179, 82, 84, 88; 524/789, 791, 855, 856; 523/207

[56] References Cited

U.S. PATENT DOCUMENTS

| | | | |
|---|---|---|---|
| 2,495,137 | 1/1950 | Rowland, Jr. | 526/913 X |
| 2,514,203 | 7/1950 | Eberly | 526/173 |
| 3,377,404 | 4/1968 | Zellinski | 260/680 |
| 3,624,057 | 11/1971 | Farrar | 260/83.7 R |
| 3,644,322 | 2/1972 | Farrar | 260/94.2 |
| 3,652,516 | 3/1972 | Farrar | 260/83.7 |
| 3,674,760 | 7/1972 | Halasa | 260/83.7 |
| 3,716,495 | 2/1973 | Hsieh | 252/431 L |
| 3,723,575 | 3/1973 | Kern et al. | 260/879 |
| 3,734,973 | 5/1973 | Farrar | 260/665 R |
| 3,776,964 | 12/1973 | Morrison et al. | 260/665 R |
| 3,784,637 | 1/1974 | Farrar | 260/448.2 |
| 4,130,703 | 12/1978 | Rashkov et al. | 526/913 X |
| 4,230,841 | 10/1980 | Prudence | 526/179 |
| 4,409,368 | 10/1983 | Vitus et al. | 525/314 |
| 4,497,748 | 2/1985 | Vitus et al. | 260/665 R |
| 4,520,123 | 5/1985 | Hall | 502/153 |
| 4,543,399 | 9/1985 | Jenkins, III et al. | 526/70 |
| 4,588,790 | 5/1986 | Jenkins, III et al. | 526/70 |
| 4,696,986 | 9/1987 | Halasa et al. | 526/181 |
| 4,730,025 | 3/1988 | Bell et al. | 525/332.3 |
| 4,994,534 | 2/1991 | Rhee et al. | 526/88 |
| 5,112,929 | 5/1992 | Hall | 526/181 |
| 5,210,144 | 5/1993 | Lawson et al. | 525/289 |
| 5,231,152 | 7/1993 | Roggeman et al. | 526/173 |
| 5,272,220 | 12/1993 | Rodgers et al. | 525/332.3 |
| 5,300,599 | 4/1994 | Hsu et al. | 502/154 |
| 5,304,588 | 4/1994 | Boysen et al. | 523/204 |
| 5,317,036 | 5/1994 | Brady, III et al. | 523/223 |
| 5,336,739 | 8/1994 | Hsu et al. | 526/181 |
| 5,416,168 | 5/1995 | Willis et al. | 525/333.2 |
| 5,464,914 | 11/1995 | Lo et al. | 526/180 |
| 5,496,940 | 3/1996 | Lawson et al. | 540/450 |

FOREIGN PATENT DOCUMENTS

| | | |
|---|---|---|
| 0261069 | 9/1987 | European Pat. Off. |
| 0262078 | 9/1987 | European Pat. Off. |
| 0282437 | 3/1988 | European Pat. Off. |
| 179208 | 5/1990 | Japan |
| 09826 | 8/1995 | WIPO |
| 09827 | 8/1995 | WIPO |

OTHER PUBLICATIONS

Polymer Science, vol. 35 No. 4 1993 Translated from Vysokomolekulyarnye Soedineniya, Ser. A. vol. 35, No. 4, 1993, pp. 367-372, "The Kinetics of 1,1-Diphenylhexyl-lithium-Initiated Gaseous Polymerization of Dienes", A.N. Konovalenko and D.K. Polyakov.

*Primary Examiner*—Fred Teskin
*Attorney, Agent, or Firm*—B. L. Deppenbrock

[57] ABSTRACT

There is provided a process comprising polymerizing a compound selected from the group consisting of a conjugated diene, a vinyl-substituted aromatic compound, and mixtures thereof in a gas phase fluidized polymerization vessel under polymerization conditions in the presence of at least one anionic initiator, optionally in the presence of an inert particulate material. A novel resin particle produced by the process is also provided.

13 Claims, No Drawings

5,728,782

GAS PHASE ANIONIC POLYMERIZATION OF DIENES AND VINYL-SUBSTITUTED AROMATIC COMPOUNDS

FIELD OF THE INVENTION

This invention relates to gas phase polymerization of conjugated dienes, vinyl-substituted aromatic compounds, and mixtures thereof in the presence of at least one anionic initiator.

BACKGROUND OF THE INVENTION

Solution and bulk polymerization of conjugated dienes and aromatic vinyl compounds in the presence of various anionic initiators is known. These multi-step processes are energy and labor intensive and require many solvent separation steps. Additionally, such processes have a number of environmental concerns associated with them. A process for polymerizing these compounds in a gas phase fluidized reactor could eliminate many downstream process steps of coagulation and washing and minimize environmental concerns.

Before the present invention, anionic initiators have not been employed in gas phase fluidized polymerizations. One reason for this is that most of the anionic initiators are liquids and only recently has it been shown that liquids, especially liquid or solution catalysts, can be employed in gas phase polymerizations. Perhaps, more importantly, anionic initiators were not employed in gas phase polymerizations because it was believed that their use would interfere or react with many of the scavenger compounds and/or passivation agents commonly employed, thereby, producing undesirable by-products or known poisons to gas phase production such as water and chloride compounds. It was also thought that they would be unstable at the temperatures and pressures of many gas phase polymerizations.

SUMMARY OF THE INVENTION

The present invention provides a process comprising polymerizing a conjugated diene, a vinyl-substituted aromatic compound, or a mixture thereof with at least one anionic initiator in a gas phase polymerization vessel, under polymerization conditions, optionally in the presence of an inert particulate material.

It has also been found that, when an inert particulate material is employed, the process produces a novel resin particle comprising an outer shell having a mixture of an inert particulate material and a polymer, said inert particulate material being present in said outer shell in an amount higher than 75% by weight based on the weight of said outer shell, and an inner core having a mixture of polymer and inert particulate material, said polymer being present in the inner core in an amount higher than 90% by weight based on the weight of said inner core, wherein said polymer is a homopolymer or copolymer of a conjugated diene, a vinyl-substituted compound or a mixture thereof, and which resin particle has a residue of a metal in Group I or Group II of the Periodic Table of Elements distributed throughout the particle, particularly a lithium residue. In contrast to polymers produced in solution or bulk polymerization processes, the resin particles of the present invention, produced in the gas fluidized polymerization process of a conjugated diene, a vinyl-substituted aromatic compound, or a mixture thereof at or above the softening temperature of the polymer in the presence of at least one anionic initiator and in the presence of one or more inert particulate materials, are granular, and free-flowing resin particles.

DETAILED DESCRIPTION OF THE INVENTION

Polymers

The polymers which can be prepared using the process of this invention include homopolymers of conjugated dienes (preferably containing 4 to 10 carbon atoms per molecule), copolymers of two or more conjugated dienes, homopolymers of monovinyl-substituted aromatic compounds (preferably containing 8 to 20 carbon atoms per molecule), copolymers of two or more monovinyl-substituted aromatic compounds, and copolymers of one or more conjugated dienes with one or more monovinyl-substituted aromatic compounds. Illustrative polymers which can be produced in accordance with the process of the invention are polybutadiene; polyisoprene; styrene-butadiene rubbers; polystyrene; styrene-isoprene-butadiene rubbers; p-methylstyrene homopolymer and copolymers; polymers of acrylonitrile, butadiene, and styrene (ABS); polymers of butadiene copolymerized with acrylonitrile (Nitrile); polymers of isobutylene copolymerized with isoprene (Butyl); polychloroprene (Neoprene®); copolymers of ethylene and vinyltrimethoxy silane; copolymers of ethylene and one or more of acrylonitrile, maleic acid esters, vinyl acetate, acrylic and methacrylic acid esters and the like. Copolymers with a primarily random monomer distribution can be obtained. Particularly preferred polymers that are produced by the process of the invention are polybutadiene, polyisoprene, styrene-butadiene rubbers, polystyrene, styrene-isoprene-butadiene rubbers, and p-methylstyrene homopolymer and copolymers.

The polymers produced by the process of the invention have a novel, granular, free-flowing resin particle comprising an outer shell having a mixture of an inert particulate material and a polymer, said inert particulate material being present in said outer shell in an amount higher than 75% by weight based on the weight of said outer shell, and an inner core having a mixture of polymer and inert particulate material, said polymer being present in the inner core in an amount higher than 90% by weight based on the weight of said inner core, wherein said polymer is a homopolymer or copolymer of a conjugated diene, a vinyl-substituted compound or a mixture thereof, and which resin particle has a residue of a metal in Group I and/or Group II of the Periodic Table of Elements distributed throughout the particle. The residue of the Group I or Group II metal can depend on the target molecular weight of the polymer, the amount of the Group I or Group II metal compound employed to passivate reactor walls, amount of inert particulate material employed in the polymerization, and the amount of monomer(s) used. The residue in the resin particle, therefore, can range from as low as about 14 ppm to 35,000 or more, but typically ranges from about 200 ppm to about 1200 ppm. Of the Group I or Group II metal residue, lithium is the most preferred residue. It is also understood that the residue can be comprised of a mixture of two or more metals from Groups I and II, a mixture of metals from Group I, or a mixture of metals from Group II. In an embodiment of the resin particle, there can be hollow or void space(s) of varying sizes and shapes. It is believed that these holes can emerge when a solution of prepolymer is employed as the anionic initiator in the polymerization process. During polymerization, it is believed that the prepolymer solvent becomes trapped inside the polymer particle while it grows, and subsequently the solvent evaporates leaving one or more void spaces. These holes can vary from about 0.001 to 50% (i.e., by volume) of the total particle diameter.

When produced in the gas phase polymerization process of the present invention, preferably in the presence of one or more inert particulate materials, the polymers are granular and free-flowing making them more readily compounded as compared to the bale form of the polymer produced in solution/slurry or bulk polymerization processes. That is, the polymers of the present invention can be continuously compounded or mixed without labor and energy intensive processing to provided intermediate, semi-finished, and finished articles at substantial economic savings to their manufacturers. When compounded with ingredients known in the art, the low molecular weight polymers produced according to this invention can be used as plasticizers, caulking compounds, sealants, potting compounds, coating compounds, and the like. The high molecular weight polymers of the inventive process have application as adhesive compositions, shoe sole, floor tile, tire tread, hose, belting, gaskets, and the like.

Monomers

Any monomer used to make the aforementioned polymers can be employed in the homopolymerization and copolymerization processes of this invention. Monomeric materials include conjugated dienes and vinyl-substituted aromatic compounds. These vinyl-substituted aromatic compounds include conjugated dienes, substituted styrenes, substituted styrenes with protected functional groups, alpha-alkyl styrenes, vinylaromatics, vinylpyridines, alkyl methacrylates and acrylates, and acrylonitriles. Conjugated diene monomers useful in the process of this invention generally are 1,3-dienes, and they contain from 4 to 12 carbon atoms and preferably from 4 to 8 carbon atoms per molecule. Examples of these dienes include the following: 1,3-butadiene, isoprene, 2,3-dimethyl-1,3-butadiene, 1,3-pentadiene (piperylene), 2-methyl 3-isopropyl-1,3-butadiene, 3-methyl-1,3-pentadiene, 2-methyl-3-ethyl-1,3-pentadiene, 2-ethyl- 1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3 -octadiene, phenyl-1,3-butadiene 2,3-diethyl-1,3-butadiene, 2,3-di-n-propyl-1,3-butadiene, 2-methyl-3-isopropyle-1,3-butadiene, and the like. Among the dialkyl butadienes, it is preferred that the alkyl groups contain from 1 to 3 carbon atoms. Conjugated dienes alkoxy substituents along the chain can also employed, such as 2-methoxy-1,3-butadiene, 2-ethoxy-3-ethyl-1,3-butadiene, and 2-ethoxy-3-methyl-1,3-hexadiene. Conjugated dienes can be polymerized alone or in admixture with each other. Copolymers can also be prepared from two or more conjugated dienes.

Vinyl-substituted aromatic compounds can be polymerized alone, in admixture with each other, or with one or more of the above-enumerated dienes. The vinyl-substituted aromatic compounds include styrene, 1-vinylnaphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 20. Examples of these aromatic monomers include p-methylstyrene, alpha-methylstyrene, 3,5-diethylstyrene, 4-n-propylstyrene, 2,4,6-trimethylstyrene, 4,dodecylstyrene, 3-methyl-5-n-hexylstyrene, 4-cyclohexylstyrene, 4-phenylstyrene, 2-ethyl-4-benzylstyrene, 4-p-tolylstyrene, 3,5-dimethylstyrene, 4-(4-phenyl-n-butyl)styrene, 3-(4-n-hexylphenyl)styrene, 4-methoxystyrene, 3,5-diphenoxystyrene, 4-dimethylaminostyrene, 3,5-bis-diethylaminostyrene, 4-methoxy-6-di-n-propylaminostyrene, 4,5-dimethyl-1-vinylnaphthalene, 3-ethyl-1-vinylnaphthalene, 6-isopropyl-1-vinyl-naphthalene, 2,4-diisopropyl-1-vinylnaphthalene, 3,6-di-p-tolyl-1-vinylnaphthalene, 6-cyclohexyl-1-vinylnaphthalene, 4,5 -diethyl-8-octyl-1-vinyl-naphthalene, 3,4,5,6-tetramethyl-1-vinylnaphthalene, 3,6-di-n-hexyl-1-vinyl-naphthalene, 8-phenyl-1-vinyl-naphthalene, 5-(2,4,6-trimethylphenyl)-1-vinylnaphthalene, 3,6-diethyl-2-vinylnaphthalene, 7-dodecyl-2-vinylnaphthalene, 4-n-propyl-5-n-butyl-2-vinylnaphthalene, 6-benzyl-2-vinylnaphthalene, 3-methyl-5,6-diethyl-8-n-propyl-2-vinylnaphthalene, 4-p-tolyl-2-vinylnaphthalene, 5-(3-phenyl-n-propyl)-2-vinylnaphthalene, 4-methoxyl-1-vinylnaphthalene, 6-phenoxyl-1-vinylnaphthalene, 3,6-dimethylamino-1-vinylnaphthalene, and the like. Other examples of vinyl-substituted aromatic compounds are found in U.S. Pat. No. 3,377,404. The amount of vinyl compound included in the polymer can be varied over a wide range depending on the desired copolymer properties. Generally, at least one percent, and more preferably over five percent of the vinyl compound and up to 40% or even 85% based on the total weight of polymer can be included. Preferably, the vinyl compound is 15 to 35% by weight of the total weight of the polymer produced.

Polymerization Conditions

The present invention is not limited to any specific type of stirred or fluidized gas phase polymerization reaction and can be carried out in a single reactor or multiple reactors (two or more reactors preferably connected in series). The process can be conducted as a continuous process or as a batch process; however a continuous process is preferred. In addition to well known conventional gas phase polymerizations processes, "condensed mode", including the so-called "induced condensed mode", and "liquid monomer" operation of a gas phase polymerization reactor can be employed.

A conventional fluidized bed process for producing resins is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream. Conventional gas phase polymerizations are disclosed, for example, in U.S. Pat. Nos. 3,922,322; 4,035,560; and 4,994,534. Optionally, and preferably, a conventional polymerization of the present invention is conducted in the presence of one or more inert particulate materials as described in U.S. Pat. No. 4,994,534.

Condensed mode polymerizations are disclosed in U.S. Pat. Nos. 4,543,399; 4,588,790; 4,994,534; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition to condensable fluids of the polymerization process itself, other condensable fluids, inert to the polymerization can be introduced to "induce" condensing mode operation. Examples of suitable condensable fluids may be selected from liquid saturated hydrocarbons containing 2 to 8 carbon atoms (e.g., ethane, propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it is desirable that the liquid entering the fluidized bed is dispersed and vaporized quickly. Optionally, and preferably, inert particulate materials as described in U.S. Pat. No. 4,994,534 can be employed in condensing and/or induced mode polymerizations.

Liquid monomer polymerization mode is disclosed in U.S. Pat. No. 5,453,471; U.S. Ser. No. 510,375; PCT 95/09826 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as polymer being produced or fluidization aids, also known as inert particulate materials (e.g., carbon black) present in the bed, so long as there is no substantial amount of free liquid monomer present more than a short distance above the point of entry into the polymerization zone. Liquid mode makes it possible to produce polymers in a gas phase reactor using monomers having condensation temperatures much higher than the temperatures at which conventional polyolefins are produced. In general, a liquid monomer process is conducted in a stirred bed or gas fluidized bed reaction vessel having a polymerization zone containing a bed of growing polymer particles. The process comprises continuously introducing a stream of one or more and optionally one or more inert gases or liquids into the polymerization zone optionally in the presence of one or more inert particulate materials; continuously or intermittently introducing a polymerization catalyst into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream, there is also present at least one inert gas. In the polymerization there is generally between about 1 to about 50% of the monomer is dissolved in the polymer. Typically, the temperature within the zone and the velocity of gases passing through the zone are such that essentially no liquid is present in the polymerization zone that is not adsorbed on or absorbed in solid particulate matter. The use of fluidization aids is preferred in the liquid monomer process of the present invention. In view of the dew points or condensation temperatures of the dienes and vinyl-substituted aromatic compounds employed in the gas phase polymerization process of the present invention, liquid monomer mode is the preferred polymerization mode.

Generally, all of the above modes of polymerizing are carried out in a gas phase fluidized bed made up of or containing a "seed bed" of polymer which is the same or different from the polymer product being produced. The bed is preferably made up of the same granular resin that is to be produced in the reactor. Thus, during the course of the polymerization, the bed comprises formed polymer particles, growing polymer particles, and initiator particles fluidized by polymerizing and modifying gaseous components introduced at a flow rate or velocity sufficient to cause the particles to separate and act as a fluid.

The fluidizing gas is made up of the initial feed, make-up feed, and cycle (recycle) gas, i.e., monomers, and, if desired, modifiers and/or an inert carrier gas (e.g., nitrogen, argon, or inert hydrocarbon such as ethane, with nitrogen being preferred). A typical cycle gas is comprised of one or more monomers, nitrogen, and optionally hydrogen, ether alone or in combination. The process can be carried out in a batch or continuous matter, the latter being preferred. The essential parts of the reactor are the vessel, the bed, the gas distribution plate, inlet and outlet piping, at least one compressor, at least one cycle gas cooler, and a product discharge system. In the vessel, above the bed, there is a velocity reduction zone, and in the bed, a reaction zone. Both are above the gas distribution plate.

Variations in the reactor can be introduced if desired. One involves the relocation of one or more cycle gas compressors from upstream to downstream of the cooler and another involves the addition of a vent line from the top of the product discharge vessel (stirred tank product) back to the top of the reactor to improve the fill level of the product discharge vessel.

Polymerization can also be conducted by charging one monomer initially, allowing it to polymerize, and then adding a second monomer, and allowing it to polymerize in a single polymerization vessel. Alternatively, two or more polymerization vessels, preferably connected in series, can be used to polymerize with two or more monomers. Using multiple reactors, one monomer can be polymerized in the first reactor, and additional monomers can be polymerized in second or subsequent reactors.

In general the polymerization conditions is the gas phase reactor are such that the temperature ranges from about 0° to 120° C., preferably about 40° to 100° C., and most preferably about 60° to 80° C. Partial pressure will vary depending upon the particular monomer employed and the temperature of the polymerization, and it can range from about 1 to 100 psi. Condensation temperatures of the monomers are well known. In general, it is preferred to operate at a partial pressure slightly above to slightly below (that is, for example, ±10° C. for low boiling monomers) the dew point of the monomer. For example, for butadiene and styrene-butadiene, the partial pressure ranges from about 10 to about 100 psi; isoprene partial pressure ranges from about 10 to about 50 psi. For styrenic polymers, styrene is fed as a ratio to achieve the desired polymer composition. For styrene polymerization in liquid monomer mode the liquid monomer (styrene) is maintained at a concentration of about 1 to about 30 wt % of styrene monomer to polymer in the reactor. Total reactor pressure ranges from about 300 to about 500 psi.

Initiator System

While not wishing to be bound by any particular mechanism, it is believed that these intiators work via anionic polymerization. The use of initiators in the gas phase fluidized polymerization of the present invention, particularly in the presence of one or more inert particulate materials, produces a free-flowing, granular polymer or rubber product requiring not solvent stripping/washing.

In general, anionic initiators involves the addition of an anion (base) to the double bond of a monomer in accordance with the following:

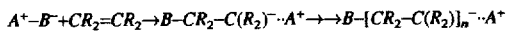

The $C^-\cdots A^+$ bond can have character ranging from partially covalent to completely ionic. Propagation occurs by the successive insertion of monomers such as dienes and/or vinyl-substituted aromatic compounds into the partial bond between the propagating anion and its metal cationic counterion (a metal counter cation).

An anionic initiator comprises a carbanion with a metal as a cation, which metal is selected from Group I (alkali metals and Group II (alkaline earth metals) of the Periodic Table of the Elements. Initiators which are employed in the present invention can be or are generated by any metal in Group I and Group II of the Periodic Table of the Elements. Illustrative of these are lithium, sodium, barium, potassium, calcium, magnesium, cesium, strontium, and mixtures thereof. Preferred among these, for reasons of cost, availability, and activity are lithium and sodium initiators, most preferred are the lithium initiators. These initiators can be used in the invention as metals (zero valence) or as organometallic compounds. Organometallic compounds are preferred. Organometallic initiators can be mono-, di-, tri-, or polyfunctional types known for polymerizing the monomers described herein. These metal cations will eventually comprise the metal residue of the final polymer product.

The anionic initiator compounds based on lithium can be selected from any known organolithium compounds which are known in the art as being useful in the polymerization of 1,3-diene monomers or vinyl-substituted aromatic compounds. In general, the lithium compounds are hydrocarbyl lithium compounds of the formula $R(Li)_x$ wherein R represents hydrocarbyl groups containing from 1 to about 20 carbon atoms, and preferably from about 2 to 8 carbon atoms, and $\underline{x}$ is an integer from 1 to 4. Although the hydrocarbyl group preferably is an aliphatic group, the hydrocarbyl groups may also be cycloaliphatic or aromatic. A combination of these groups can also be employed. The aliphatic groups may be primary, secondary, or tertiary, although primary and secondary groups are preferred. Examples of aliphatic hydrocarbonyl groups include methyl, ethyl, n-propyl, isopropyl, n-butyl, sec-butyl, t-butyl, n-amyl, sec-amyl, n-eicosyl, n-hexyl, sec-hexyl, 1, 1-diphenylhexyl, n-heptyl, n-octyl, n-nonyl, n-decyl, n-dodecyl and octadecyl. The aliphatic groups may contain some unsaturation such as allyl, 2-butenyl, etc. Cycloalkyl groups are exemplified by cyclopentyl, cyclohexyl, methylcyclohexyl, ethylcyclohexyl, cycloheptyl, cyclopentylmethyl, methylcyclopentylethyl. Examples of aromatic groups include phenyl, tolyl, phenylethyl, benzyl, naphthyl, phenylcyclohexyl, etc.

Specific examples of organolithium compounds which are useful as anionic initiators in the polymerization of conjugated dienes in accordance with the process of this invention include the following: n-butyl lithium, sec-butyl lithium, n-propyl lithium, isobutyl lithium, tertiary butyl lithium, amyl lithium, cyclohexyl lithium.

Mixtures of different lithium initiator compounds also can be employed preferably containing one or more lithium compounds such as $R(Li)_x$. The preferred anionic initiator based on lithium is n-butyl lithium and sec-butyl lithium.

Other lithium catalysts which can be employed alone or in combination with the hydrocarbyl lithium initiators are lithium dialkyl amines, lithium dialkyl phosphines, lithium alkyl aryl phosphines, lithium diaryl phosphines, triorganotin lithium and lithium catalysts having the formula $RO(Li)_x$ wherein R and $\underline{x}$ are as defined above. Such initiators make polymers with functionalized end groups. These polymers are of interest as they have special features. For example they may be formulated with carbon black in elastomeric products resulting in reduced hysteresis.

Organometallic compounds are most notably those of Groups I, II, and III of the Periodic Table of the Elements, such as organomagnesium and organoaluminum compounds which may be included in the initiator systems of the invention alone or especially in combination with the lithium initiator compound to form mixed organometallic initiators. The second organometallic compound may be represented by the formulae $R_2Mg$ and $R_3Al$ where R represents hydrocarbyl groups as defined above. Preferably the R groups in the magnesium compound are alkyl groups containing 1 to 10 carbon atoms and the R groups in the aluminum compound are alkyl groups containing 1 to 8 carbon atoms. The R groups may be the same or different.

Suitable magnesium compounds can include, for example, isopropyl-isobutyl magnesium, di-n-butyl magnesium, di-sec-butyl magnesium, sec-butyl-n-amyl magnesium, di-n-amyl magnesium, diisoamyl magnesium, dihexyl magnesiums, and dibenzyl magnesiums, dixylyl magnesiums. The preferred magnesium compounds are (n-butyl, sec-butyl) magnesium and di-n-butyl magnesium.

Examples of suitable trialkyl aluminum compounds include trimethyl aluminum, triethyl aluminum, tri(iso- or n-)propyl aluminum, tri-isobutyl or tri-n-butyl aluminum, etc. The preferred trialkyl aluminum compound for use in the present catalyst system is triethyl aluminum or triisobutyl aluminum.

Mixtures of organometallic initiators can include, for example, the following: n-butyl lithium and di-n-butyl magnesium; n-butyl lithium, di-n-butyl magnesium and tri-n-butyl aluminum. In this specification and in the claims, the term co-initiator may be used to refer to the mixtures of the anionic lithium initiator with the magnesium and/or aluminum compounds.

The amount of initiator required to effect the desired polymerization can be varied over a wide range depending upon a number of factors such as the desired polymer molecular weight, the desired 1,2- and 1,4-content, and the desired physical properties for the polymer produced. For many applications, the preferred initiator composition is an hydrocarbyl lithium compound used alone. In these instances, the amount of initiator utilized may vary from as little as 0.20 millimole of lithium per 100 grams of conjugated diene monomer up to about 500 millimoles of lithium per 100 grams of conjugated diene depending upon the desired polymer molecular weight.

When the lithium initiators are used in conjunction with the co-initiators, magnesium or aluminum hydrocarbyl compounds, the ratio of the lithium to magnesium or aluminum metals can vary over a wide range such as within the molar ratio of 1: near 0 to 1:10. In some instances, there appears to be advantages in using the mixtures of organometallics, since it appears that desired products can be obtained even though the amount of the lithium is reduced, and there further appears to be improved stability in the polymerization system.

In solution/slurry or bulk polymerizations, the multifunctional initiators are preferred in order to produce high molecular weight polymers, and monofunctional initiators more often result in low molecular weight polymers. Also, in solution/slurry or bulk polymerizations, the monofunctional initiators are easily deactivated and/or require sufficient lithium functionality to override such effects.

In contrast, in the present invention for gas phase polymerization using initiators, it has been found that the monofunctional organometallic initiators tend to produce higher molecular weight polymers, while the multifunctional or polyfunctional organometallic initiators have a tendency to more readily produce a lower molecular weight polymer. Therefore, the monofunctional organometallic initiators are preferred, and of these, butyl lithiums (especially sec-, n-, and tert-) are most preferred for the gas phase polymerization of the present invention. The preferred polyfunctional organometallic initiators are the multilithium initiators. Typically, multilithium initiators employed in the present invention are prepared (i) from an alkyllithium (usually a monoarkyl lithium) and a multifunctional vinyl compound such as trivinylphosphine, tetravinylsilane, diisopropenylbenzene, or a mixture of them; (ii) from an alkyllithium and an acetylenic compound having two or more, preferably at least three, acidic hydrogens; or (iii) a mixture of the reaction products of (i) and (ii). The multifunctional organolithium initiators can be either specific organolithium compounds or can be multifunctional types which are not necessarily specific compounds but rather represent reproducible compositions of regulatable functionality. Such multifunctional organolithiums are taught, for example, in U.S. Pat. Nos. 3,624,057; 3,644,322; 3,652,516; 3,734,973; 3,776,964; 3,784,637; 4,409,368; and 4,497,748.

The use of a monofunctional and a multifunctional anionic initiator at different points in time in the same reactor or their use sequentially in either order in two reactors can result in a bimodal, or even a polymodal, polymer or rubber, having at least two different molecular weight components.

Other anionic initiators, sometimes referred to as radical initiators, employable in the present invention can include alfin systems, sodium naphthlates, and Group I and II metals (e.g., lithium and sodium in their zero valence state). Alfin catalysts contain an alkenyl sodium (e.g. allyl sodium), a sodium alkoxide (e.g. sodium isopropoxide), and a halide salt (e.g. sodium chloride) in an approximate molar ratio of 0.2-0.8:1:0.6-3, preferably 0.38:1:1.5. Although the molar ratio of the alfin catalysts seems to be important during use, variations in the composition can be tolerated.

Use of Initiators in Gas Phase

One or more initiators are introduced continuously or intermittently into the reactor in the form of a slurry, a solution, a solid, or a combination thereof. The initiators are introduced directly into the reactor or into the reactor via the cycle lines and can be introduced alone or in combination with one or more of the other reactants or modifiers.

When the initiator is introduced as a liquid in the form of a slurry or solution, it is dispersed or dissolved in a suitable diluent. Inert diluents can include hydrocarbon or polar compounds or mixtures thereof. Exemplary diluents that can be employed are alkanes, cycloalkanes, and aromatics containing from 1-20 carbon atoms, mono- and di- ethers having 2-20 carbon atoms, alkenes having 3-20 carbon atoms, and mixtures of them. Illustrative hydrocarbons are propane, butane, isobutane, isopentane, n-pentane, n-heptane, isooctane, cyclohexane, benzene, toluene, xylene, ethylbenzene, t-butyl benzene, pseudocumeme, 2-butene, cyclooctene, mixtures thereof and the like. Exemplary of some polar compounds suitable for employment according to the invention are ethers (e.g., diethyl ether, diisopropyl ether, butyl ether, tetrahydrofuran), thioethers, tertiary amines, mixtures thereof and the like. Hydrocarbon oils that can be employed include, for example, mineral oil, such as Kaydol®. The concentration range of the adducts in slurry/solution/or off dilution, may be varied widely, with slurry/solutions/oil dilutions containing between about 0.5 to 5 equivalents adduct per liter, with 0.5 and 2 equivalents adduct per liter, based on metal of the initiator, being particularly desirable.

When the initiator is a solid, it is introduced in solid form (e.g., granular powder or pellets) into the reactor continuously or intermittently using procedures well known to those skilled in gas phase polymerization. Generally, it is introduced in the same manner as a conventional solid transition metal catalyst which is metered in alone or in combination with one or more other reactants directly into the reactor or into the cycle lines. Direct introduction to the reactor is preferred.

However, the preferred manner of introducing any of the initiators is in the form of a prepolymer. Use of a prepolymer is preferred because it readily produces higher molecular weight polymers with narrow molecular weight distribution, which polymers are desirable for many commercial fabrication applications. In general, the prepolymer is formed by combining the initiator, monomer, and optional solvent in any order. While any order can be employed, it is preferred to add the monomer last after having combined initiator and solvent when present.

If the ratio of initiator to monomer is maintained suitably high, additional solvent is not required. Typically, though, a solvent is used. In general, the amount of solvent employed is that amount which provides a suitable viscous prepolymer solution (or dispersion, depending upon the initiator used) capable of being fed to the reactor.

The amount of monomer used generally depends upon desired molecular weight of the final prepolymer. The higher the molecular weight of the prepolymer desired, the more monomer needed for the same amount of initiator. That is, the higher the monomer to initiator ratio, the higher the molecular weight of the prepolymer formed. And conversely, the lower the monomer to initiator ratio, the lower the molecular weight of the prepolymer. For most prepolymerizations described by this invention, the monomer concentration ranges from about 1 to about 60 weight percent in a suitable solvent. Preferably, the monomer concentration ranges from about 10 to about 50 wt %, most preferably from about 20 to about 40 wt % in the solvent. In general, the molar ratio of initiator to monomer to solvent can range from about 1 (initiator): 2–30 (monomer): 2–50 (solvent); preferably from about 1:15–30:20–40; most preferably from about 1:15–25:25–35.

Any suitable solvent medium which allows prepolymerization to take place can be employed. The diluents set forth above for solution/slurry initiator preparation can be employed to prepare the prepolymer. However, in some instances of prepolymer preparation, it is desirable to remove or replace the solvent or diluent (e.g., to remove or replace a polar solvent such an ether) before adding the prepolymer to the reactor.

Typically, for prepolymerization the initiator, monomer, and optional solvent are combined and allowed to react for at least 5 minutes or longer, or up until all of the monomer has reacted. The prepolymer so formed is stable and can be stored for long periods of time, in a sealed container, under nitrogen, or other means which excludes moisture.

Any monomer suitable for polymerization in this invention can be used for prepolymerization. Low molecular weight polydienes are also suitable, e.g., polybutadiene with average Mn of 3,000. It is preferred to use the same monomer for prepolymerization as for the polymerization.

The prepolymer can range in consistency from a solid, to a viscous liquid, to a free-flowing liquid. The prepolymer is typically a liquid and is introduced batchwise or continuously, preferably continuously, to the gas phase fluidized reactor in accordance with known procedures for introduction of liquid or solution catalysts into a gas phase reactor such as those disclosed in U.S. Pat. No. 5,317,036. When the prepolymer is in solid form, it is introduced intermittently or continuously into the reactor in accordance with known methods used for other conventional prepolymer operations or as are other solid catalysts.

The amount of initiator used in the gas phase polymerization process of the invention depends upon the initiator employed and the type of polymer desired. An effective amount is generally in the range of about 0.2 to 500, preferably is about 1 to 50 gram milliequivalents of metal per 100 grams of monomer (mehm) charged.

Optionally, modifiers such as Lewis bases can be added along with the prepolymer. Lewis bases such as amines, ethers, and ethoxides can be used in the gas phase process of the invention as additives to modify the reaction behavior of any of the anionic initiators (particularly organolithium initiators) regardless of whether they are in solid, solution/slurry, or prepolymer form. Polar modifiers are especially useful in the preparation of polydiene rubbers prepared with lithium initiator systems in order to increase their vinyl content, or to promote random copolymerization of styrene and diene. Examples of commonly used modifiers are given, for example, in U.S. Pat. Nos. 4,022,959 and 4,696,986.

Fluidization Aids

Also referred to herein as inert particulate materials or flow aids, fluidization aids employed in the invention can be inert particulate materials which are chemically inert to the reaction. Examples of such fluidization aids include carbon black, silica, clays, other like materials such as talc, and mixtures thereof. Organic polymeric materials can also be employed as a fluidization aid. Carbon blacks, silica, and mixtures of them are the preferred fluidization aids with carbon black being the most preferred. The carbon black materials employed have a primary particle size of about 10 to 100 nanometers and an average size of aggregate (primary structure) of about 0.1 to about 10 microns. The specific surface area of the carbon black is about 30 to 1,500 m2/gm and the carbon black displays a dibutylphthalate (DBP) absorption of about 80 to about 350 cc/100 grams.

Silicas which can be employed are amorphous and have a primary particle size of about 5 to 50 nanometers and an average size of aggregate of about 0.1 to 10 microns. The average size of agglomerates of silica is about 2 to about 120 microns. The silicas employed have a specific surface area of about 50 to 500 m2/gm and a dibutylphthalate (DBP) absorption of about 100 to 400 cc/100 grams.

Clays which can be employed according to the invention have an average particle size of about 0.01 to about 10 microns and a specific surface area of about 3 to 30 m2/gm. They exhibit oil absorption of about 20 to about 100 gms per 100 gins.

Organic polymeric substances which can be used include polymers and copolymers of ethylene, propylene, butene, and other alpha olefins and polystyrene, in granular or powder form. These organic polymeric materials have an average particle size ranging from about 0.01 to 100 microns, preferably 0.01 to 10 microns.

In general, the amount of fluidization aid utilized generally depends on the type of material utilized and polymer produced. When utilizing carbon black or silica, or preferably a mixture of the two, as the fluidization aid, they can be employed in amounts of about 0.3% to about 80% by weight, preferably about 5% to about 60%, and most preferably about 10% to about 45%, based on the weight of the final product (polybutadiene or polysioprene) produced. When clays or talcs are employed as the fluidization aid, the amount can range from about 0.3% to about 80% based on the weight of the final product, preferably about 12% to 75% by weight. Organic polymeric materials are used in amounts of about 0.1% to about 50% by weight, preferably about 0.1% to about 10% based on the weight of the final polymer product produced.

The fluidization aid can be introduced into the reactor at or near the top of the reactor, at the bottom of the reactor, directly into the polymerization zone of the reactor, and/or to the recycle line directed into the bottom of the reactor. Preferably, the fluidization aid is introduced at or near the top of the reactor or above the fluidized bed. It is preferred to treat the fluidization aid prior to entry into the reactor to remove traces of moisture and oxygen. This can be accomplished by purging the material with nitrogen gas and heating by conventional procedures. The fluidization aids can be added separately or combined with one or more monomers, or with an initiator. Preferably, the fluidization aid is added separately.

Termination

The gas phase polymerization process using anionic initiators of the present invention can be terminated with a conventional noncoupling type of terminator, such as water, an acid, a lower alcohol, and the like. Of these, it is preferred to use a lower alcohol having 1 to 10 carbon atoms, preferably 1 to 6 carbon atoms. The amount of terminating agent employed can range from the stoichiometric amount necessary to deactivate the active centers to up to ten times that amount. Practically, the amount of terminating agent employed ranges from the stoichiometric amount up to three times that amount. Such terminators are disclosed, for example, in U.S. Pat. Nos. 5,210,144; 5,416,168; 5,464,914; and 5,496,940.

Alternatively, one or more coupling agents or functionalization agents can be used to terminate polymerization. Coupling agents can be employed to raise molecular weight and the technique of forming "star" polymers has proved to be feasible through the use of polyfuctional linking agents. Coupling agents are typically added in a post polymerization step and can lead to better processibility and other properties. Some representative examples of suitable coupling agents include: multivinylaromatic compounds, multiepoxides, multiisocyanates, multimiines, multialdehydes, multiketones, multihalildes, multianhydrides, multiesters which are esters of polyalcohols with monocarboxylic acids, and the diesters which are esters of monohydric alcohols with dicarboxylic acids, and the like. Other suitable coupling agents can include, for example, silicon tetrachloride, methyltrichloro silane, dimethyldichloro silane, 1,2,4-tri(chloromethyl)benzene, 1,2-bis(trichlorosilyl)ethane, 1,2,4,5-tetra(chloromethyl) benzene, hexa[(p-chloromethyl)phenyl]benzene, m- and p-divinylbenzene. Illustrative examples of these different classes of coupling agents are known and disclosed, for example, in U.S. Pat. No. 4,696,986; 4,520,123; 5,112,929; 5,210,144; 5,300,599; and 5,336,739.

When employed, the amount of coupling agent ranges from about 0.01 to 4.5 milliequivalents of coupling agent per 100 grams of monomer. The coupling agent can be added neat or in a hydrocarbon diluent (e.g., cyclohexane) to the reactor or downstream of the reactor, for example, in the discharging tank with suitable mixing for distribution and reaction.

The living chain end can also be functionalized or coupled to other species with compounds providing terminal functionality. Functionalization of chain ends can be employed in the invention to permit the preparation of a wide variety of functional oligomers which can be used as prepolymers for subsequent polycondensations. It also enables molecular groups with specific properties to be attached to chain ends. Functionalization agents include, e.g., alkoxy chloro silanes of the formula $Cl_xSi(OR)_{4-x}$ where x is from 1 to 3 especially $Si(OR)_3Cl$; tin alkoxides of the formula $R_xSn(OR)_{4-x}$ where x is from 0 to 3; $R_xSn(Cl)_{4-x}$ where x is from 0 to 3; carbodiimines; N-methylpyrolidine; cyclic amides; cyclic amides; isocyanates; Schiff bases; 4,4'-bis(diethyl amino) benzophenone; tetraalkylthiuram disulfides; xanthates; pentachlorocyclopentadiene; and other functionalizing agents well known to the art. In the above, enumerated functionalization agents, each R group is individually an alkyl having from 1 to 20 carbons, a cycloalkyl having from 3 to 20 carbon atoms, an aryl having 6 to 20 carbon atoms, or an aralkyl having 7 to 20 atoms.

End group functionalization improves physical properties of the rubber, since functional end groups may react with the polymer backbone or with carbon black or other fillers or additives. This results in a lower concentration of dangling end segments in such cured polymers.

Another option for end group functionalization is the use of Li initiators containing the functional groups as mentioned above. Functionalization at both chain ends can then be achieved, e.g., by termination with one or more coupling agents. Further examples of functionalization is obtained by reacting one or more anionic polymers with $CO_2$ under specific conditions, to thereby obtain fully end-carboxylated polymers.

Hydroxy-terminated polymers can be easily obtained by reacting polymeric living-ends with ethylene oxide or lactones.

Primary amine terminal groups can be employed and are obtained by two methods. The first method uses an initiator bearing a protected amine function, which is then regenerated when polymerization is achieved. To produce diamino telechelic polymers, coupling can be performed using $Cl_2SiMe_2$ to react with living ends before deactivation. The second method involves reaction of the living polymer with precursors of amino groups, e.g. silylated aldimine and following with hydrolysis.

Other Additives

Some compounds may be used to neutralize static in the fluidized-bed reactor, others known as drivers rather than antistatic agents, may consistently force the static to from positive to negative or from negative to positive. These methods of static control and compounds for controlling static are disclosed, for example, in U.S. Pat. Nos. 4,792, 592; 4,803,251; 4,855,370; 4,876,320; 5,162,463; 5,194, 526; 5,200,477 and 3,391,477. The use of these additives is well known to those skilled in the art. These additives may be added to the reaction zone separately or in combination with one or more of the other reactants (monomers, fluidization aids, chain transfer agent, recycle gas, etc.).

Fouling of the recycle lines can be effectively controlled or halted by introducing veratrole (1,2-dimethoxy benzene), methanol, tetrahydrofuran, Atmer™ 163, or propylene glycol into the recycle lines at compressor junction in the reactor system. Reduction of fouling of the cycle gas line, compressor, and cycle gas cooler can typically be accomplished using a feed rate of about 5 lb/hr of a 0.1 wt % solution in isopentane.

All references cited herein are incorporated by reference.

Whereas the scope of the invention is set forth in the appended claims, the following specific examples illustrate certain aspects of the present invention. The examples are set forth for illustration only and are not to be construed as limitations on the invention, except as set forth in the claims. All parts and percentages are by weight unless otherwise specified.

EXAMPLES

Preparation of Initiator I

Two milliliters of n-butyl lithium (1.6 M in hexane, 3.2 mmol) were added via syringe to a stirred solution of 5 ml dry hexane and 5 ml isoprene in a cooled crimp top bottle. The mixture was stirred for one hour. The light yellow, viscous solution contained living polymer as the actual active catalyst and was storable at room temperature for a long period of time. Alternatively, sec-butyl lithium was used instead of n-butyl lithium and butadiene instead of isoprene.

Preparation of Initiator II (Solution prepared from 3 eq. BuLl and 1-hexyne). To a stirred solution of 0.5 ml of 1-hexyene (0.366g, 4.45 retool) was added n-BuLl (8.5 milliliters, 1.6 M in hexane, 13.6 retool) in 20 ml dry hexane in a rubber sealed crowned polymerization bottle at room temperature under nitrogen. The resulting slurry was stirred vigorously for one hour. Then 20 ml isoprene were added with a syringe and the mixture was heated to about 80° C. for three hours. After cooling to room temperature, the resulting reddish brown solution was ready for use as a prepolymerized catalyst. Quenching with trimethyl silyl chloride before GC/MS Analysis indicated di- and tri-lithiation of 1-hexyne.

Preparation of Initiator III

The initiator prepared according to this procedure was used in the polymerization of Example 11. A three-neck round bottom flask was charged under nitrogen with 130 ml isopentante and 0.1 mole sec-BuLi (77 milliliters, 1.3M solution in cyclohexane) and cooled with an ice bath. Distilled isoprene (130 ml) was slowly added to this solution through a dropping funnel. The resulting yellow solution was stirred for another two hours before it was charged to a Hoke® cylinder and fed to the reactor as a solution.

Lab-scale Gas Phase Polymerization Procedure

Examples 1–10

A reaction vessel (one-liter, stirred metal autoclave) was charged with inert particulate material and dried with nitrogen at 90° C. for one hour. The temperature in the vessel was adjusted to the desired temperature, and a small initial charge of initiator was added to passivate the vessel. The vessel was pressure purged using the diene or a vinyl-substituted aromatic compound to be polymerized before the desired amount of initiator was added. The vessel was pressurized with one or more dienes or vinyl-substituted compounds to be polymerized. The feed rate was adjusted so that a constant pressure was maintained during the reaction.

When styrene was copolymerized, it was injected intermittently every 20 minutes. The polymerizations of the Examples were terminated using a stabilizer package and methanol alone or methanol and water washings and the product was dried under vacuum. Variations in parameters of the Examples are set forth in Tables 1 and 2. Examples 1–4 demonstrate the use of different inert particulate materials. In Example 5, a coupling agent is added to the reaction mixture before termination and the mixture is stirred for an additional 30 minutes before washing/drying. Example 6 employed a multilithium initiator. Example 7 demonstrated a butadiene polymerization, while Examples 8–10 were copolymerizations.

Pilot Plant Gas Phase Polymerization Procedure

Example 11

To a gas-phase reactor that was maintained at a constant temperature of 20° C., 2.5 pounds of dried carbon black powder (passivated with 0.3 lb. of n-butyllithium [1.3 M in hexane]) was added to serve as the inert particulate material or flow aid. The reactor temperature was then adjusted to 75° C., and 0.9 lb. of isoprene and sufficient nitrogen was added to bring the total reactor pressure up to 315 psia. A continuous feed of initiator solution was begun. During the course of a 7-hour polymerization reaction, a total amount of 4.81 lb. additional isoprene was fed in order to replace isoprene that was polymerized or vented. The cycle gas composition was 8.6 mole % isoprene, 90 mole % $N_2$ and 1.4 mole % other inert gases. A small vent stream leaving the reactor carried out a total of 0.81 lb. isoprene during the polymerization. At the end of the polymerization all feeds were stopped. The reactor was depressurized, and isopropanol was added to terminate the polymerization. The reactor contents were purged free of residual isoprene using nitrogen. Then the polymer was discharged from the reactor. The polymer product was free-flowing and granular. The reactor was opened and cleaned to ensure that all product was recovered. The total weight of solid product that was recovered was adjusted for the carbon black that had been initially charged. The remainder (3.57 lb.) was the amount of isoprene polymer formed and which was present in the reactor when it was shut down.

The product contained 41% carbon black and 0.12% lithium. The avarage weight molecular weight of the polymer was 2,400,000 with a molecular weight distribution of 2.2. The monomer incorporated as 81.9% 1,4, cis; 13.1% 1,4, trans; and 5.0% 3,4 vinyl. Since a total of 5.71 lb. (=4.81+0.90) of isoprene was charged to the reactor and a total of 4.38 lb. (=3.58+0.81) of isoprene have been accounted for leaving the reactor as polymer and in the continuous vent stream, there must have been 1.33 lb. of isoprene monomer present in the reactor when polymerization was terminated. This monomer would have been removed from the reactor when it was depressurized and the contents purged.

Polymer Product Characterization

The weight of the polymer was used to determine yield. The microstructure was determined by $^{13}C$ NMR and IR. GPC data were obtained with a Waters® 590 instrument and ERMA ERC-7510 differential refractometer detector at ambient temperature with Waters® Styagel columns (HR-1, HR-3, HR-4, HR-4E, HR-SE) and tetrahydrofuran as the mobile phase. Polystyrene standards were used for calibration in the molecular weight range from 162 to 1,800,000.

TABLE 1

| | EXAMPLE NO. | | | | | |
|---|---|---|---|---|---|---|
| | 1 | 2 | 3 | 4 | 5 | 6 |
| | | | PRODUCT: POLYISOPRENE | | | |
| Reaction Conditions: | | | | | | |
| Initiator No. | I | I | I | I | I | II |
| Initiator (mmole) | 0.75 | 2.0 | 2.0 | 1.0 | 1.0 | 1.0 |
| Flow aid* | NaCl/CB | CB | silica | NaCl/CB | NaCl/CB | NaCl/CB |
| Temperature (°C.) | 70 | 75 | 75 | 70 | 70 | 75 |
| Pressure (psi) | 33 | 26 | 28 | 28 | 28 | 30 |
| Reaction time (hr) | 3.5 | 3.5 | 4.0 | 3.0 | 3.0 | 3.3 |
| Coupling agent (mmole) | — | — | — | — | $SiMe_2Cl_2$ 0.5 | — |
| Product Analysis: | | | | | | |
| Polymer yield (g) | 28.3 | 15.6 | 21.6 | 20.5 | — | 6.6 |
| Monomer incorporation (wt %) | | | | | | |
| Butadiene | — | — | — | — | — | — |
| Styrene | — | — | — | — | — | — |
| Isoprene | 100 | 100 | 100 | 100 | 100 | 100 |
| % 1,4 cis | 83 | 76 | 72 | 76 | — | 66 |
| % 1,4 trans | 12 | 19 | 21 | 18 | — | 28 |
| % vinyl | 5 | 5 | 7 | 6 | — | 6 |
| $M_w$ (*1000) | 1,119 | 807 | 870 | 483 | — | 510 |
| $M_w/M_n$ | — | 1.8 | 2.0 | 1.4 | — | 2.0 |

TABLE 2

| | EXAMPLE NO. | | | |
|---|---|---|---|---|
| | 7 | 8 | 9 | 10 |
| | PRODUCT: | | | |
| | Poly-butadiene | SBR Copolymer | Isoprene-Butadiene Copolymer | Styrene-Isoprene Copolymer |
| Reaction Conditions: | | | | |
| Initiator No. | I | I | I | I |
| Initiator (mmole) | 0.75 | 2.0 | 2.0 | 1.0 |
| Flow aid* | NaCl/CB | CB | silica | NaCl/CB |
| Temperature (°C.) | 60 | 80 | 75 | 80 |
| Pressure (psi) | 34 | 34 | 28 | 28 |
| Reaction time (hr) | 3.5 | 3.0 | 4.5 | 4.0 |
| Coupling agent (mmole) | — | — | — | — |
| Product Analysis: | | | | |
| Polymer yield (g) | 30.7 | 33.1 | 19.2 | 27.3 |
| Monomer incorporation (wt %) | | | | |
| Butadiene | 100 | 79 | 44 | — |
| Styrene | — | 21 | — | 32 |
| Isoprene | — | — | 56 | 68 |
| % 1,4 cis | 61 | | | |
| % 1,4 trans | 23 | | | |
| % vinyl | 16 | | | |
| $M_w$ (*1000) | 709 | 808 | 840 | 1087 |
| $M_w/M_n$ | 6.8 | 6.5 | 1.8 | 1.9 |

*NaCl = CB = carbon black N 650 available from Columbian Chemical Company in Louisiana. Silica employed was 958-600 available from Davison in Maryland.

What is claimed is:

1. A process comprising polymerizing a compound selected from the group consisting of a conjugated diene, a vinyl-substituted aromatic compound, and mixtures thereof in a gas phase polymerization vessel under polymerization conditions in the presence of at least one organolithium anionic initiator in the presence of at least one inert particulate material.

2. The process of claim 1 wherein the inert particulate material is selected from the group consisting of carbon black, silica, clay, talc, polymeric material, and mixtures thereof.

3. The process of claim 1 wherein the anionic initiator is a lithium organyl initiator containing a functional group for generating polymer with terminal functionality.

4. The process of claim 1 wherein the organolithium anionic initiator is selected from the group consisting of monofunctional lithium compounds, multifunctional lithium compounds, and mixtures thereof.

5. The process of claim 4 wherein the monofunctional lithium compound is selected from the group consisting of n-butyl lithium, sec-butyl lithium, tert-butyl lithium, isobutyl lithium, and mixtures thereof.

6. The process of claim 4 wherein the multifunctional lithium compound is (i) the reaction product of an alkyllithium and an acetylenic compound having two or more acidic hydrogens; (ii) the reaction product of an alkyllithium and multifunctional vinyl compound selected from the group consisting of trivinylphosphine, tetravinylsilane, diisopropenylbenzene, and mixtures thereof; or (iii) a mixture of the reaction products of (i) and (ii).

7. The process of claim 2 wherein the polymerization is conducted in a gas phase reaction vessel having a polymerization zone containing a bed of growing polymer particles under polymerization conditions in the presence of an effective amount of an anionic initiator which comprises:

(i) continuously or intermittently introducing one or more monomers and optionally at least one inert gas into the polymerization zone;

(ii) optionally continuously or intermittently introducing one or more other inert particulate materials into the reaction vessel;

(iii) continuously or intermittently withdrawing polymeric product from the reaction vessel; and (iv) continuously or intermittently withdrawing unreacted monomers and gases from the polymerization zone.

8. The process of claim 7 wherein in step (iv) said gases are compressed and cooled optionally while maintaining the temperature within the polymerization zone below the dew point of at least one monomer present in the polymerization zone.

9. The process of claim 7 wherein the anionic initiator is introduced as a prepolymer.

10. The process of claim 7 wherein between about 1 to about 50% of the monomer is dissolved in the polymer.

11. The process of claim 7 wherein additional modifiers are employed in the polymerization.

12. The process of claim 7 wherein a coupling agent, a functionalization agent or a mixture thereof is used to terminate the polymerization.

13. The process of claim 7 wherein the polymerization process is terminated by introducing a termination agent selected from the group consisting of water, an alcohol, tetrahydrofuran, an organic or inorganic acid, a coupling agent, a functionalization agent, and mixtures thereof.

* * * * *